United States Patent [19]

Schmid et al.

[11] 3,937,751

[45] Feb. 10, 1976

[54] CURABLE COMPOSITIONS BASED ON EPOXIDE RESINS AND POLYESTER-TRICARBOXYLIC ACIDS OR -TETRACARBOXYLIC ACIDS

[75] Inventors: Rolf Schmid, Gelterkinden; Friedrich Lohse, Oberwil; Willy Fatzer, Bottmingen; Hans Batzer, Arlesheim, all of Switzerland

[73] Assignee: Ciba-Geigy Corporation, Ardsley, N.Y.

[22] Filed: Dec. 6, 1974

[21] Appl. No.: 530,334

[30] Foreign Application Priority Data
Dec. 19, 1973 Switzerland.................... 17807/73

[52] U.S. Cl............ 260/835; 260/28 P; 260/37 EP; 260/40 R; 260/75 EP; 260/824 EP; 260/836; 260/837 R
[51] Int. Cl.²........................................ C08L 63/00
[58] Field of Search..................... 260/835, 75 EP

[56] References Cited
UNITED STATES PATENTS

| | | | |
|---|---|---|---|
| 3,408,421 | 10/1968 | Kurka................................. | 260/835 |
| 3,576,903 | 4/1971 | Groff................................. | 260/835 |
| 3,739,041 | 6/1973 | Schmid.............................. | 260/835 |
| 3,816,365 | 6/1974 | Schmid.............................. | 260/835 |

FOREIGN PATENTS OR APPLICATIONS

| | | | |
|---|---|---|---|
| 1,164,584 | 9/1969 | United Kingdom................. | 260/835 |
| 1,182,728 | 4/1970 | United Kingdom................. | 260/835 |

*Primary Examiner*—Paul Lieberman
*Attorney, Agent, or Firm*—Nestor W. Shust; Vincent J. Cavalieri

[57] ABSTRACT

Curable epoxide resin mixtures based on adducts, containing epoxide groups, which are obtained by reaction of certain long-chain aliphatic polyesters with an excess of diepoxide compounds, and linear or slightly branched polyesters, containing carbocyclic or heterocyclic rings and possessing 3 or 4 terminal carboxyl groups, and having an average molecular weight of 600 – 6,000, 0.7 – 1.2 equivalents of carboxyl groups being present in the curable mixture per 1 equivalent of epoxide groups. Curing these epoxide resin mixtures gives flexible moulded materials which are distinguished by high tear propagation resistance.

16 Claims, No Drawings

CURABLE COMPOSITIONS BASED ON EPOXIDE RESINS AND POLYESTER-TRICARBOXYLIC ACIDS OR -TETRACARBOXYLIC ACIDS

The subject of the present invention are new, curable mixtures based on long-chain adducts, containing epoxide groups, and polyester-tricarboxylic acids and/or -tetracarboxylic acids, and the use of these curable epoxide resin mixtures for the manufacture of moulded materials.

It is known that the flexibility of moulded materials manufactured from epoxide resins can be increased by adding agents which impart flexibility, such as polyalkylene glycols or long-chain polyesters. However, this method of imparting flexibility has the drawback that the advantage of greater flexibility is achieved very much at the expense or other valuable mechanical properties.

It has already been proposed, in British Patent Specifications No. 1,182,728 and No. 1,183,434, to use long-chain polyesters of a special structure for the (so-called) "advancement" of epoxide resins, or as agents for imparting flexibility in curable epoxide resin mixtures. The curing of the epoxide resins which have been (so-called) "advanced" in this way, or of epoxide resin mixtures which have been rendered more flexible in this way, gives flexible and impact-resistant moulded materials in which the mechanical properties are largely independent of the temperature.

It has not been found that curing of epoxide resin mixtures which contain epoxide resins which have been so-called advanced by means of long-chain aliphatic polyesters, and polyester-tricarboxylic acids and/or polyester-tetracarboxylic acids of a special structure, containing rings, gives flexible moulded materials which are distinguished, compared to the previously known flexible moulded materials, by a pronounced increase in the toughness (half the product of the tensile strength and the elongation at break) and in particular by a tear propagation resistance which is improved 3-fold to 6-fold.

Accordingly, the subject of the present invention are curable epoxide resin mixtures based on epoxide resins and polyester-tricarboxylic acids and/or -tetracarboxylic acids, characterised in that they contain a. at least 60 per cent by weight, based on the total amount of epoxide resin, of adducts, containing epoxide groups, of the formula I

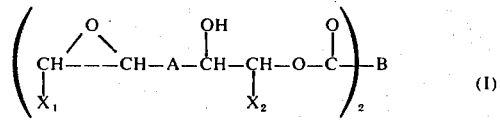

wherein $X_1$ and $X_2$ each denote a hydrogen atom or the methyl group and A denotes the radical, obtained by removal of the 1,2-epoxyethyl groups, of a diglycidyl compound, or wherein A together with $X_1$ and/or $X_2$ and with inclusion of the grouping

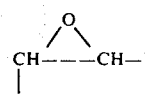

and/or

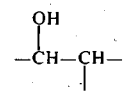

denotes the cycloaliphatic ring or the cycloaliphatic ring system of a partially reacted cycloaliphatic or cycloaliphaticaliphatic diepoxide compound, B denotes a long-chain polyester radical in which unsubstituted or substituted alkylene and/or alkenylene chains alternate with carboxylic acid ester groups, and the quotient Z/Q, wherein Z is the number of carbon atoms present in the recurring structural element of the radical B and Q is the number of oxygen bridges present in the recurring structural element of the radical B, has to be at least 4 and preferably at least 5 and, furthermore, the total number of carbon atoms present in the radical B is at least 50, and b. as curing agents, linear or slightly branched polyesters, possessing 3 or 4 terminal carboxyl groups and having an average molecular weight of 600 – 6,000, which contain at most 30, and preferably 2 – 20, structural elements of the formula II

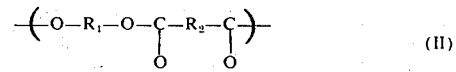

wherein $R_1$ and $R_2$ denote divalent aliphatic, araliphatic, cycloaliphatic, cycloaliphatic-aliphatic, aromatic or heterocyclic-aliphatic radicals, and at least one of the two radicals $R_1$ or $R_2$ has to contain a carbocyclic or heterocyclic ring or a carbocyclic or heterocyclic ring system and not more than 4, preferably not more than 3, methylene groups are present in the structural element per ring, component (b) being present in an amount such that 0.7 – 1.2, preferably 0.9 – 1.0, equivalents of carboxyl groups are present in the mixture per 1 equivalent of epoxide groups.

Preferably, the curable epoxide resin mixtures contain, as curing agents, acid polyesters wherein $R_1$ and $R_2$ in the structural element of the formula II denote araliphatic, aromatic, cycloaliphatic, cycloaliphatic-aliphatic or heterocyclic-aliphatic radicals and not more than 2 methylene groups are present in the structural element per ring in the radical $R_1$ and $R_2$.

In a particular embodiment, the curable epoxide resin mixtures of the present invention consist only of the adducts, containing epoxide groups, of the formula I and the preferentially used polyester-tricarboxylic acids or -tetracarboxylic acids.

The adducts, containing epoxide groups, of the formula I are known compounds and can be manufactured in accordance with the process described in British Patent 1,182,728, by a reaction, entailing adduct formation, of diepoxide compounds with longchain dicarboxylic acids of the formula

HOOC—B—COOH wherein B has the same meaning as in the formula I, at elevated temperatures and employing 0.5 to 0.3 equivalent of carboxyl groups per 1 equivalent of epoxide groups.

All classes of diglycidyl compounds, such as, for example, diglycidyl ethers, diglycidyl esters of diglycidyl compounds of N,N-heterocyclic structures, such as hydantoin, dihydrouracil or benzimidazolone, and the cycloaliphatic diepoxides, are suitable for the manufacture of the adducts containing epoxide groups. Preferably, aromatic, cycloaliphatic or N-heterocyclic diglycidyl compounds and the cycloaliphatic diepoxide compounds are used.

The long-chain dicarboxylic acids used to manufacture the adducts containing epoxide groups are acid polyesters with two terminal carboxyl groups.

The preferentially used acid polyesters correspond to the formula III

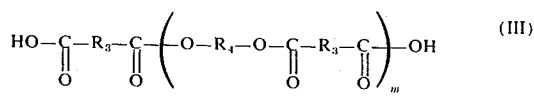

wherein $R_3$ and $R_4$ denote unsubstituted or substituted alkylene or alkenylene chains and each of the two radicals $R_3$ and $R_4$ must contain at least such a number of carbon atoms that the sum in $R_3$ and $R_4$ together is at least 8, the number $m$ being so chosen that the product of $m$ and the sum (C atoms in $R_3$ + C atoms in $R_4$) is at least 50.

However, it is also possible to use acid polyesters which are manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. Of course, it is also possible to manufacture acid polyesters by condensation of mixtures of different dicarboxylic acids with mixtures of different diols, always providing that the conditions postulated above for the quotient Z/Q and the total number of carbon atoms in the polyester chain remain observed.

Long-chain acid polyesters which are obtained by addition reaction of (a + b) mols of a lactone with 1 mol of an aliphatic dicarboxylic acid and correspond to the formula IV

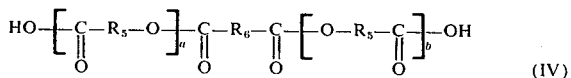

wherein $R_5$ denotes an alkylene chain with at least 4 carbon atoms, $R_6$ represents an aliphatic hydrocarbon radical and the numbers $a$ and $b$ are so chosen that the product of (a + b) and the sum of the C atoms in $R_5$ is at least 50, are also suitable for the manufacture of the adducts containing epoxide groups.

In these long-chain polyesters, the recurring structural element in the polyester chain is thus formed by the lactone used, and only one oxygen bridge is contained in the structural element. In that case, the quotient Z/Q is equal to the number of carbon atoms in the hydrocarbon radical of the lactone from which the acid polyester is synthesised.

The manufacture of the adducts containing epoxide groups is as a rule effected by simply fusing together the diepoxide compound and the corresponding acid polyester in the prescribed stoichiometric ratios. As a rule, this is done in the temperature range of 100° – 200°C, preferably 130° – 180°C.

Before curing, up to 40 per cent by weight, based on the total amount of epoxide resin, of conventional epoxide resins can also be admixed to the adducts containing epoxide groups, but in that case the advantageous mechanical properties of the cured products are less pronounced than when using adducts of the epoxide resin which only contain epoxide groups.

The polyesters used as curing agent components in the epoxide resin mixtures according to the invention and having a molecular weight of 600 – 6,000 and containing the structural element of the formula II, are obtained according to known methods by polycondensation of diols of the formula HO—$R_1$—OH with dicarboxylic acids of the formula HOOC—$R_2$—COOH, but these polyester components must be so chosen that either the diol component or the acid component or both components contain one or more rings and the aliphatic chains contained in the structural element of the formula II are not too long. For example, a dicarboxylic acid with more than 3 methylene groups in the molecule is only suitable for the purposes of the invention if the diol used for the esterification has an appropriate number of rings. Thus, a polyester manufactured from adipic acid and bis-(4-hydroxycyclohexyl)-methane or 1,1-bis-(hydroxymethyl)-cyclohexene-3 would fulfil the abovementioned condition.

Of course, it is also possible to use polyesters which are manufactured by condensation of a suitable dicarboxylic acid with a mixture of two or more suitable diols, or conversely by condensation of a suitable diol with a mixture of two or more suitable dicarboxylic acids, in the correct mutual stoichiometric ratio. Naturally it is also possible to use polyesters which have been manufactured by condensation of mixtures of different dicarboxylic acids with mixtures of different diols, provided that the conditions postulated above for the structural elements remain observed.

Further, the molar ratio of the diol and the dicarboxylic acid must be so chosen, for the polycondensation, that the structural element of the formula II occurs at least three times in the polyester.

The following may be mentioned as dicarboxylic acids, containing at least one ring, which can be used to synthesise the polyesters containing the structural element of the formula II: phthalic acid, isophthalic acid, terephthalic acid, tetrachlorophthalic acid, tetrahydrophthalic acid, hexahydrophthalic acid, 4-methylhexahydrophthalic acid, 3,6-endomethylene-tetrahydrophthalic acid, methyl-3,6-endomethylenetetrahydrophthalic acid, 3,4,5,6,7,7-hexachloro-3,6-endomethylenetetrahydrophthalic acid, diphenic acid, phenylenediacetic acid, hydroquinone-0,0'-diacetic acid, diomethane-0,0'-diacetic acid and naphthalenedicarboxylic acids.

Where a diol containing at least one ring is chosen as a reactant for the esterification, examples of non-cyclic dicarboxylic acids which can be used are oxalic acid, malonic acid, succinic acid, glutaric acid, adipic acid and allylsuccinic acid.

The following may be mentioned as dialcohols, containing at least one ring, which can be used to synthesise the polyesters containing the structural element of the formula II: 1,1-, 1,2-, 1,3- and 1,4-bis-(hydroxymethyl)-cyclohexane and the corresponding unsaturated cyclohexene derivatives, such as, for example, 1,1-bis-(hydroxymethyl)-cyclohexene-3 and 1,1-bis-(hydroxymethyl)-2,5-endomethylenecyclohexene-3; hydrogenated diphenols, such as cis-quinitol, trans-quinitol, resorcitol, 1,2-dihydroxycyclohexane, bis-(4-hydroxycyclohexyl)-methane and 2,2-bis-(4'-hydroxycyclohexyl)-propane; tricyclo(5.2.1.0$^{2,6}$) decane-3,9- or -4,8-diol, adducts of glycols to diallylidenepentaerythritol, for example 3,9-bis(hydroxyethoxyethyl)spirobi(metadioxane) and the diols containing the N-heterocyclic ring, such as 1,3-bis-(2-hydroxyethyl)-5,5-dimethylhydantoin, 1,3-bis-(2-hydroxy-n-propyl)-5-isopropylhydantoin, 1,3-bis-(2-phenyl-2-hydroxyethyl)-5,5-diethylhydantoin, 1,1′-methylene-bis-(3-β-hydroxyethyl-5,5-dimethylhydantoin), 1,1′-methylene-bis-(3-β-hydroxy-n-propyl-5,5-dimethyl-hydantoin), 1,3-bis-(2-hydroxyethyl)-benzimidazolone, 1,3-bis-(2-hydroxy-n-propyl)-benzimidazolone, 1,3-bis-(2-phenyl-2-hydroxyethyl)-benzimidazolone and the partially or completely benzhydrogenated derivatives.

To synthesise the polyesters it is also possible to use, as the diols, diphenols such as hydroquinone, resorcinol, pyrocatechol or diomethane (= 2,2-bis(p-hydroxyphenyl)propane).

Where a dicarboxylic acid containing at least one ring is chosen as a reactant for the esterification, it is also possible to use non-cyclic diols, for example ethylene glycol, 1,2-propanediol, 1,3-propanediol, 1,4-butanediol, 1,5-pentanediol and neopentyl glycol.

The linear polyesters containing 4 terminal carboxyl groups correspond to the formula V

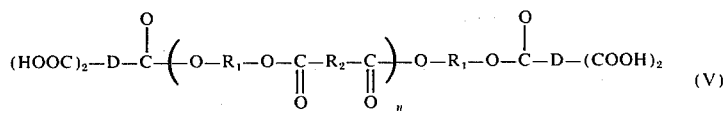

(V)

wherein $R_1$ and $R_2$ have the same meaning as in the formula II, D denotes the organic radical, obtained by removing the 3 carboxyl groups, of a tricarboxylic acid, preferably of an aromatic tricarboxylic acid, and the number n, which indicates the number of structural elements

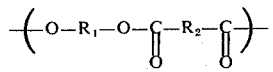

in the linear chain is 1 – 30, preferably 2 – 20.

These polyesters are manufactured by first synthesising a polyester containing hydroxyl end groups, of the formula

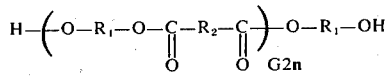

in accordance with known methods, by polycondensation of diols of the formula HO—$R_1$—OH with dicarboxylic acids of the formula HOOC—$R_2$—COOH in the appropriate molar ratio. Depending on the chosen molar ratio of diol to dicarboxylic acid and the completeness of the condensation reaction, polyesters of various chain lengths are obtained. The polyester containing hydroxyl groups is then reacted, in a second stage, with a tricarboxylic acid or its anhydride to give the tetracarboxylic acid of the formula V, for which reaction 1 mol of tricarboxylic acid or its anhydride is used per equivalent of hydroxyl group.

Examples of tricarboxylic acids which can be used are: trimellitic acid, trimesic acid, aconitic acid, citric acid, tricarballylic acid or butane-1,2,4-tricarboxylic acid. Instead of the tricarboxylic acid, its anhydrides can optionally be used. Preferably, aromatic tricarboxylic acids are used in this reaction.

The slightly branched polyesters containing 3 terminal carboxyl groups correspond to the formula

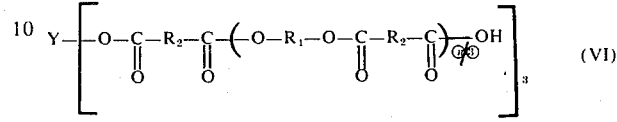

(VI)

wherein $R_1$ and $R_2$ have the same meaning as in the formula II, Y denotes the hydrocarbon radical, obtained by removing the hydroxyl groups, of a trihydric aliphatic or cycloaliphatic alcohol or of a trihydric phenol and $n$ denotes a number from 1 to 30, preferably 2 to 20, and the quotient $n/3$ indicates the average number of structural elements

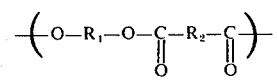

per linear branch chain.

These polyesters are manufactured in accordance with the following equation:

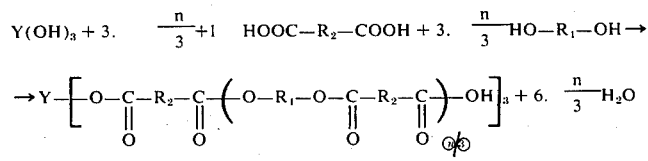

Instead of a dicarboxylic acid, the corresponding dicarboxylic acid anhydride can also be used. Examples of the trihydric alcohols or phenols used as starting molecules in this reaction are: glycerol, 1,1,1-trimethylolpropane, 1,1,1-trimethylolethane, hexane-1,2,6-triol, hexane-2,4,6-triol, butane-1,2,4-triol, 3-hydroxymethyl-2,4-dihydroxypentane, 3,4,8-trihydroxytetrahydrodicyclopentadiene, cyclohexane-1,2,3-triol as well as pyrogallol, phloroglucinol and hydroxyhydroquinone (1,2,4-trihydroxybenzene).

In the above equation, it is also possible to employ a tricarboxylic acid of the formula Z(COOH)$_3$ as the starting molecule, Z denoting the trivalent hydrocarbon radical of this tricarboxylic acid. In that case, 1 mol of the tribasic tricarboxylic acid must be reacted in each case with (3·n/3) mols of a dicarboxylic acid and (3·n/3) mols of a diol. The slightly branched polyesters, containing three terminal carboxyl groups, which are obtained in this way correspond to the formula

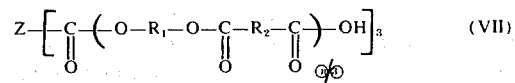

(VII)

wherein $R_1$ and $R_2$ have the same meaning as in the formula II, Z denotes the hydrocarbon radical, obtained by removal of the carboxyl groups, of a tribasic aliphatic, cycloaliphatic or aromatic tricarboxylic acid and $n$ denotes a number from 1 to 30, preferably from 2 to 20, with the quotient n/3 indicating the average number of the structural elements

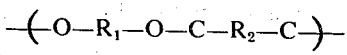

per linear branch chain.

The following are examples of tricarboxylic acids which can be used as tribasic starting molecules: trimellitic acid, trimesic acid, aconitic acid, citric acid, tricarballylic acid and butane-1,2,4-tricarboxylic acid; instead of the tricarboxylic acids, their anhydrides can optionally be employed.

The slightly branched polyesters, containing three terminal carboxyl groups, according to the general formulae VI and VII are manufactured according to the known melt condensation process. For this, the trihydric alcohols or phenols or tribasic carboxylic acids are mixed with the corresponding amounts of dicarboxylic acid or dicarboxylic acid anhydride and diol and allowed to react at 150°–250°C until the calculated acid equivalent weight has been reached. The condensation reaction is advantageously completed in vacuo.

The curing of the epoxide resin mixtures according to the invention, to give moulding materials, is suitably carried out in the temperature range of 100°– 200°C. The curing can also be carried out stepwise at different temperatures, in which case the pre-curing is carried out at a lower temperature and the post-curing then at a higher temperature. The curing can, if desired, also be carried out in two stages by first prematurely discontinuing the curing reaction, which gives a precondensate which is still fusible and soluble (a so-called "B-stage"). Such a precondensate can serve, for example, for the manufacture of "Prepregs", compression moulding compositions or, in particular, sintering powders.

In order to shorten the curing times, curing accelerators can also be added to the curable epoxide resin mixtures according to the invention. Suitable accelerators of this nature are, in particular, tertiary amines, their salts or quaternary ammonium compounds, for example 2,4,6-tris(dimethylaminomethyl)-phenol, benzyldimethylamine, 2-ethyl-4-methyl-imidazole and triamylammonium phenolate, but also alkali metal alcoholates, such as, for example, sodium hexanetriolate.

The term "curing", as used here, denotes the conversion of the above mixtures into insoluble and infusible, cross-linked products, as a rule with simultaneous shaping to give shaped articles, such as castings, pressings or laminates or sheet-like structures, such as lacquer films or adhesive bonds.

Accordingly, a further subject of the present invention is the process for the manufacture of shaped articles or sheet-like structures, characterised in that (a) epoxide resins which contain at least 60% by weight, based on the total amount of epoxide resin, of adducts, containing epoxide groups, of the formula I and (b) linear or slightly branched polyesters possessing 3 or 4 terminal carboxyl groups and an average molecular weight of 600 – 6,000, which contain at most 30, and preferably 2–20, structural elements of the formula II in an amount of 0.7–1.2, preferably 0.9 – 1.0, equivalents of carboxyl group per 1 equivalent of epoxide group, are reacted with one another, whilst undergoing shaping, at an elevated temperature, preferably in the temperature range of 100° – 200°C, until the cross-linked, infusible state is reached.

Furthermore, customary modifiers, such as extenders, fillers and reinforcing agents, pigments, dyestuffs, organic solvents, plasticisers, flow control agents, agents for conferring thixotropy, flameproofing substances and mould release agents can be added to the curable mixtures according to the invention at any stage before curing.

The following may be mentioned as examples of extenders, reinforcing agents, fillers and pigments which can be employed in the curable mixtures according to the invention: textile fibres, glass fibres, boron fibres, carbon fibres, cellulose, polyethylene powders, polypropylene powders, mica, asbestos, quartz powder, slate powder, aluminium oxide trihydrate, chalk powder, gypsum, antimony trioxide, bentones, silica aerogel ("AEROSIL"), lithopone, baryte, titanium dioxide, carbon black, graphite, iron oxide or metal powders, such as aluminium powder or iron powder.

Examples of suitable organic solvents for modifying the curable mixtures are toluene, xylene, n-propanol, butyl acetate, acetone, methyl ethyl ketone, diacetone-alcohol, ethylene glycol monomethyl ether, monoethyl ether and monobutyl ether.

Furthermore, other customary adjuvants, for example flameproofing agents, agents for conferring thixotropy, flow control agents, such as silicones, cellulose acetobutyrate, polyvinylbutyral, waxes, stearates and the like (which in part are also used as mould release agents) can be added to the curable mixtures.

The curable mixtures can be produced in the usual manner with the aid of known mixing equipment (stirrers, kneaders, mills and the like).

The curable epoxide resin mixtures are employed, above all, in the fields of the electrical industry and of laminating processes.

They can be used, in each case in a formulation suited to the particular application, in the unfilled or filled state, optionally in the form of solutions, as stoving lacquers, sintering powders, compression moulding compositions, dipping resins, casting resins, injection moulding formulations, impregnating resins and adhesives, tooling resins, laminating resins and potting and insulating compositions for the electrical industry.

Manufacture of the long-chain aliphatic polyesters

Polyester I 1,111 g (5.5 mols) of sebacic acid were mixed with 520 g (5.0 mols) of neopentyl glycol (corresponding to a molar ratio of 11 : 10) and the mixture was warmed to 185°C under a nitrogen atmosphere. It was then left to react further for 5 hours at 185°C and 2 hours under 24 – 16 mm Hg. The resulting polyester was a yellow viscous mass having an acid equivalent weight of 1,080 (theory: 1,450).

Polyester II 1,168 g (8 mols) of adipic acid were mixed with 728 g (7 mols) of neopentyl glycol and the mixture was warmed to 170°C under a nitrogen atmosphere. It was then warmed to 210°C over the course of 4 hours and thereafter left to react further for 2 hours at 180°C under 14 mm Hg.

The resulting polyester is a yellow viscous mass having an acid equivalent weight of 705 (theory: 822).

Manufacture of the adducts containing epoxide groups

Adduct I 1,080 g (1.0 acid equivalent) of polyester I and 390 g (2.5 epoxide equivalents) of 3',4'-epoxyhexahydrobenzal-3,4-epoxycyclohexane-1,1-dimethanol having an epoxide content of 6.4 epoxide equivalents/kg were allowed to react for 3 hours at 140°C. The resulting adduct was a highly viscous, dark brown mass having an epoxide equivalent weight of 968.

Adduct II 2,000 g (1.0 acid equivalent) of polyester II and 1,000 g (2.5 epoxide equivalents) of bisphenol A diglycidyl ether having an epoxide content of 5.4 epoxide equivalents/kg were allowed to react for 3 hours at 140°C. The resulting adduct was a light brown, viscous mass having an epoxide equivalent weight of 1,290.

Adduct III 423 g (2.5 equivalents) of 1-glycidyl-3-(2'-glycidyloxy-n-propyl)-5,5-dimethylhydantoin of the formula

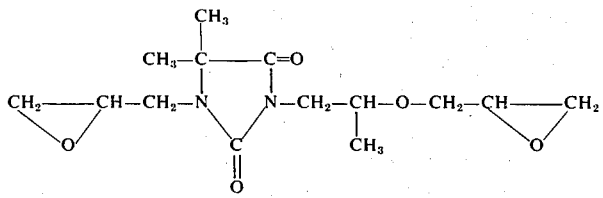

having an epoxide content of 5.95 epoxide equivalents/kg were allowed to react with 705 g (1.0 equivalent) of the acid polyester II for 3 hours at 150°C. The resulting adducts had an epoxide equivalent weight of 800.

Manufacture of the polyesters used as curing agents

Polyester A (Tricarboxylic acid)

23.0 g (0.25 mol) of glycerol were mixed with 366.0 g (2.5 mols + 3% excess) of 1,1-bis-(hydroxymethyl)-cyclohexene-3 and 500.5 g (3.25 mols) of hexahydrophthalic anhydride (corresponding to a molar ratio of 1:10:13) and the mixture was warmed to 170°C.

The reaction mixture was allowed to react for 17 hours at 170°C and for 28 hours under 50 mm Hg at the same temperature. During this reaction, 28.0 g of water were split off. The resulting reaction product was a light yellow, clear, glassy mass having an acid equivalent weight of 1,103 (theory: 1,111.3) and a glass transition temperature of 48°C.

Polyester B (Tetracarboxylic acid)

924 g (6 mols) of hexahydrophthalic anhydride and 951 g (6.5 mols + 3% excess) of 1,1-bis-(hydroxymethyl)-cyclohexene-3 were fused together at 180°C and then allowed to react at 190° – 200°C under a $N_2$ atmosphere until the acid equivalent was above 6,000. This required 48 hours. The hydroxyl equivalent weight of the product was 1,452. 1,970 g (1.357 hydroxylequivalents) of this product were mixed with 260.0 g (1.357 mols) of trimellitic anhydride, with addition of 1.5 ml of benzyldimethylamine, and the reaction mixture was warmed to 180°C. It was then allowed to react for 9½ hours at 180°C.

The resulting product was brown, clear and glassy and had an acid equivalent weight of 821 (theory: 822) and a glass transition temperature of 74°C.

Polyester C (Tetracarboxylic acid)

592 g (4.0 mols) of phthalic anhydride and 379.5 g (6 mols + 2% excess) of ethylene glycol (corresponding to a molar ratio of 2:3) were allowed to react for 35 hours in a sulphonation flask, fitted with a descending condenser, at 170°–180°C under nitrogen, and thereafter for a further 4 hours at the same temperature under a 50 mm Hg waterpump vacuum. The amount of water split off was then 74 g (theory: 72 g). The resulting product was clear and highly viscous and had a hydroxyl equivalent weight of 340.

384 g (2 mols) of trimellitic anhydride were added to 680 g (2 hydroxyl equivalents) of the product obtained above and fused together for 3 hours at 180°C. The acid equivalent weight of the light yellow glassy product was then 288 (theory: 266).

Polyester D (Tricarboxylic acid)

23.0 g (0.12 mol) of trimellitic anhydride, 341 g (2.4 mols) of 1,1-bis-(hydroxymethyl)-cyclohexene-3 and 365 g (2.4 mols) of 1,2,3,6-tetrahydrophthalic anhydride were mixed, finely powdered in a mortar, introduced into a preheated sulphonation flask fitted with a descending condenser, and fused. The molar ratio of the components used is 1:20:20. The resulting light yellow melt was then heated to 190°C under nitrogen and the water produced by the polycondensation was distilled off continuously. After 14 hours' reaction time, 78 g of water (theory: 86 g) had been split off. The reaction product was then allowed to react for a further 3 hours under 50 mm Hg water-pump vacuum. In the course thereof, there was only a slight further rise in the acid equivalent weight, which was 1,705 at the end of the reaction (theory: 1,904). The product is a light brown, clear, glassy mass.

Polyester E (Tetracarboxylic acid)

176.4 g (1.2 mols + 2% excess) of 1,4-bis-(hydroxymethyl)-cyclohexane and 179.0 g (1.08 mols) of isophthalic acid (corresponding to a molar ratio of 10:9) were mixed and 1 ml of dibutyltin dilaurate was added as the catalyst. The reaction mixture was then heated to 220° – 240°C for 36 hours under nitrogen, in the course of which 41 g of water (theory: 39 g), containing a little of the glycol employed, were distilled off. The acid equivalent weight was 10,500 and the hydroxyl equivalent weight 1,312 (theory: 1,305).

262.5 g (0.2 hydroxyl equivalent) of the product obtained above and 38.4 g (0.2 mol) of trimellitic anhydride were fused for 6 hours under nitrogen at 180°C. The acid equivalent weight of the resulting tetracarboxylic acid was 703 (theory: 752). The reaction was monitored by following the anhydride bands in the IR spectrum and was discontinued after these had disappeared completely.

EXAMPLES

Example 1

96.8 g (0.1 epoxide equivalent) of adduct I, 110.3 g (0.1 carboxyl equivalent) of polyester A and 0.1% of benzyldimethylamine were warmed to 140°C and well mixed. The mixture was briefly subjected to a vacuum to remove the air bubbles and then poured into pre-warmed aluminium moulds, which had been treated with a release agent and were of size 150 × 150 × 4 mm and 150 × 150 × 1 mm, and was cured for 16 hours at 140°C. Mouldings having the following properties were obtained.

| | |
|---|---|
| Tensile strength (according to VSM* 77,101) | = 11.5 N/mm$^2$ |
| Elongation at break (according to VSM 77,101) | = 380% |
| Toughness | = 21.8 N/mm$^2$ |

EXAMPLE 2

129 g (0.1 epoxide equivalent) of adduct II, 9.3 g (0.05 epoxide equivalent) of a bisphenol A diglycidyl ether having an epoxide content of 5.4 epoxide equivalents/kg and 123 g (0.15 carboxyl equivalent) of polyester B were processed, cured and tested analogously to Example 1. Mouldings with the following properties were obtained:

| | |
|---|---|
| Tensile strength (according to VSM 77,101) | = 19.7 N/mm$^2$ |
| Elongation at break (according to VSM 77,101) | = 226% |
| Tear propagation resistance (according to DIN** 53363) | = 11.9 kg |
| Toughness | = 22.3 N/mm$^2$ |
| Tensile stress at 50% elongation | = 6.6 N/mm$^2$ |

*VSM = Normvorschrift des Vereins Schweiz. Maschinenindustrieller
**DIN = Deutsche Industrie-Norm
N = Newton; 1 N/mm$^2$ ≅ 10 kp/cm$^2$ $$\text{Toughness} = \frac{\text{tensile strength} \times \text{elongation at break}}{2}$$

COMPARISON EXAMPLES a. 100 g (0.0775 epoxide equivalent) of adduct II, 10 g (0.054 epoxide equivalent) of the bisphenol A diglycidyl ether used in Example 2, 18.7 g (0.129 equivalent of anhydride group) of hexahydrophthalic anhydride and 0.1% of benzyldimethylamine were processed, cured and tested analogously to Example 1.

| | |
|---|---|
| Tensile strength (according to VSM 77,101) | = 25.6 N/mm$^2$ |
| Elongation at break (according to VSM 77,101) | = 143% |
| Tear propagation resistance (according to DIN 53,363) | = 2.7 kg |
| Toughness | = 18.3 N/mm$^2$ |
| Tensile stress at 50% elongation | = 6.1 N/mm$^2$ | b. 30 g (0.162 epoxide equivalent) of the bisphenol A diglycidyl ether used in Example 2, 70 g (0.199 epoxide equivalent) of a polypropylene glycol diglycidyl ether having an epoxide content of 3.06 epoxide equivalents/kg, 57.9 g (0.376 equivalent of anhydride group) of hexahydrophthalic anhydride and 0.1% of benzyldimethylamine were processed, cured and tested analogously to EXAMPLE 1.

| | |
|---|---|
| Tensile strength (according to VSM 77,101) | = 11.9 N/mm$^2$ |
| Elongation at break (according to VSM 77,101) | = 77% |
| Tear propagation resistance (according to DIN 53,363) | = 2.9 kg |
| Toughness | = 4.6 N/mm$^2$ |
| Tensile stress at 50% elongation | = 7.0 N/mm$^2$ |

The mouldings produced according to the comparison examples show the same tensile stress at 50% elongation as the moulding obtained in Example 2. Accordingly, whilst all the mouldings are equally soft, the moulding produced according to Example 2 shows better toughness and in particular a tear propagation resistance which is improved four-fold.

EXAMPLE 3

12.7 g (0.1 epoxide equivalent) of 1,3-diglycidyl-5,5-dimethylhydantoin, 80.0 g (0.1 epoxide equivalent) of adduct III and 57.6 g (0.2 carboxyl equivalent) of polyester C were mixed at 160°C, subjected to a vacuum and processed, cured and tested analogously to Example 1. Mouldings with the following properties were obtained:

| | |
|---|---|
| Tensile strength (according to VSM 77,101) | = 11.5 N/mm$^2$ |
| Elongation at break (according to VSM 77,101) | = 140% |
| Tear propagation resistance (according to DIN 53,363) | = 9.5 kg |

EXAMPLE 4

24.1 g (0.025 epoxide equivalent) of adduct I and 42.6 g (0.025 carboxyl equivalent) of polyester D were processed, cured and tested analogously to Example 1. Mouldings with the following properties were obtained:

| | |
|---|---|
| Tensile strength (according to VSM 77,101) | = 16.4 N/mm$^2$ |
| Elongation at break (according to) VSM 77,101) | = 325% |
| Tear propagation resistance (according to DIN 53,363) | = 12.2 kg |

EXAMPLE 5

48.4 g (0.05 epoxide equivalent) of adduct I were mixed with 35.2 g (0.05 carboxyl equivalent) of polyester E at 180°C and processed, cured and tested analogously to Example 1. Mouldings with the following properties were obtained:

| | |
|---|---|
| Tensile strength (according to VSM 77,101) | = 9.5 N/mm$^2$ |
| Elongation at break (according to VSM 77,101) | = 30% |

EXAMPLE 6

40.0 g (0.05 epoxide equivalent) of adduct III, 8.35 g (0.05 epoxide equivalent) of a triglycidylhydantoin having the following structure

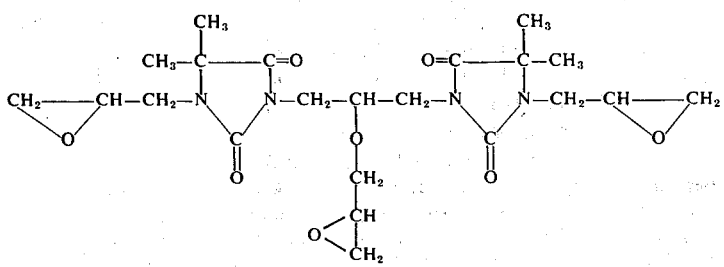

and an epoxide content of 6.0 epoxide equivalents/kg and 54.0 g (0.1 carboxyl equivalent) of polyester B were processed, cured and tested analogously to Example 1. Mouldings with the following properties were obtained.

| | |
|---|---|
| Tensile strength (according to VSM 77,101) | = 14.9 N/mm² |
| Elongation at break (according to VSM 77,101) | = 120% |
| Tear propagation resistance (according to DIN 53,363) | = 11 kg. |

We claim:
1. A curable epoxide resin composition based on adducts containing epoxide groups and polyester-tricarboxylic acids and/or -tetracarboxylic acids, characterised in that it comprises
   a. at least 60 per cent by weight, based on the total amount of epoxide resin, of adducts containing epoxide groups, of the formula I

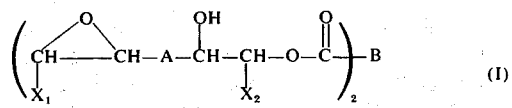

wherein $X_1$ and $X_2$ each denote hydrogen or methyl and A denotes the radical, obtained by removal of the 1,2-epoxyethyl groups of a diglycidyl compound, or wherein A together with $X_1$ and/or $X_2$ and with inclusion of the grouping

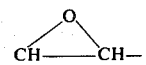

and/or

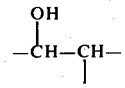

denotes the cycloaliphatic ring or the cycloaliphatic ring system of a partially reacted cycloaliphatic or cycloaliphatic-aliphatic diepoxide compound, B denotes a long-chain polyester radical obtained by removing both carboxyl groups from a polyester dicarboxylic acid in which unsubstituted or substituted alkylene and/or alkenylene chains alternate with carboxylic acid ester groups, and the quotient Z/Q, wherein Z is the number of carbon atoms present in the recurring structural element of the radical B and Q is the number of oxygen bridges present in the recurring structural element of the radical B, has to be at least 4 and, furthermore, the total number of carbon atoms present in the radical B is at least 50, and
   b. as curing agents, linear or slightly branched polyesters possessing 3 or 4 terminal carboxyl groups and having an average molecular weight of 600 – 6,000, which contain at most 30, structural elements of the formula II

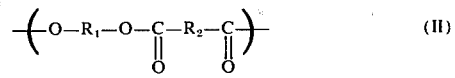

wherein $R_1$ and $R_2$ denote divalent aliphatic, araliphatic, cycloaliphatic, cycloaliphatic-aliphatic, aromatic or heterocyclic-aliphatic radicals, and at least one of the two radicals $R_1$ or $R_2$ has to contain a carbocyclic or heterocyclic ring or a carboxylic or heterocyclic ring system and not more than 4 methylene groups are present in the structural element per ring, component (b) being present in an amount such that 0.7 – 1.2 equivalents of carboxyl groups are present in the mixture per 1 equivalent of epoxide groups.

2. A composition according to claim 1, characterised in that it comprises adducts, containing epoxide groups, of the formula I, wherein A denotes the radical, obtained by removing the 1,2-epoxyethyl groups of a diglycidyl compound containing an aromatic, cycloaliphatic or N,N-heterocyclic ring.

3. A composition according to claim 2, characterised in that the radical A denotes the radical of a bisphenol-A diglycidyl ether.

4. A composition according to claim 2, characterised in that the radical A denotes the radical of 1-glycidyl-3-(2'-glycidyloxy-n-propyl)-5,5-dimethylhydantoin.

5. A composition according to claim 1, characterised in that it comprises adducts, containing epoxide groups, of the formula I, wherein A together with $X_1$ and $X_2$ denotes the ring system obtained after partial reaction of 3',4'-epoxyhexahydrobenzal-3,4-epoxycyclohexane-1,1-dimethanol.

6. A composition according to claim 1, characterised in that it comprises, as curing agents, acid polyesters with the structural element of the formula II, wherein $R_1$ and $R_2$ denote araliphatic, aromatic, cycloaliphatic, cycloaliphatic-aliphatic or heterocyclic-aliphatic radicals and not more than 2 methylene groups are present in the structural element per ring in the radical $R_1$ and $R_2$.

7. A composition according to claim 1 consisting essentially of adducts, containing epoxide groups, of the formula I and of acid polyesters with the structural element of the formula II.

8. A composition according to claim 1, characterised in that it comprises adducts, containing epoxide groups, of the formula I, wherein B denotes the radical, obtained by removing both carboxyl groups, of a polyester-dicarboxylic acid of the formula

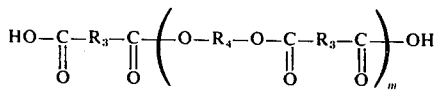

wherein $R_3$ and $R_4$ denote unsubstituted or substituted alkylene or alkenylene chains and each of the two radicals $R_3$ and $R_4$ must contain at least such a number of carbon atoms that the sum of the carbon atoms in $R_3$ and $R_4$ together is at least 8, and wherein the number $m$ is so chosen that the product of $m$ and of the sum of the C atoms in $R_3$ + C atoms in $R_4$ is at least 50.

9. A composition according to claim 1, characterised in that it comprises adducts, containing epoxide groups, of the formula I, wherein B denotes the radical, obtained by removing both carboxyl groups of a polyester-dicarboxylic acid of the formula

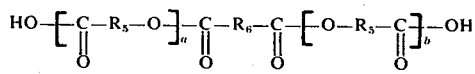

wherein $R_5$ denotes an alkylene chain with at least 4 carbon atoms, $R_6$ represents an aliphatic hydrocarbon radical and the numbers $a$ and $b$ are so chosen that the product of $(a + b)$ and of the sum of the C atoms in $R_5$ is at least 50.

10. A composition according to claim 1, characterised in that it comprises, as curing agents, linear polyesters, possessing 4 terminal carboxyl groups, of the formula

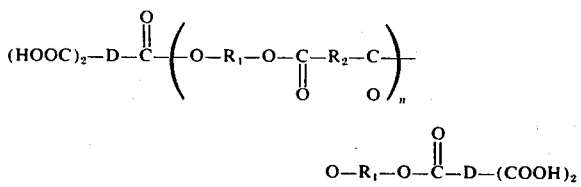

wherein $R_1$ and $R_2$ have the same meaning as in the formula II, D denotes the organic radical, obtained by removing the 3 carboxyl groups, of a tricarboxylic acid and the number $n$, which indicates the number of structural elements in the linear chain, is 1 – 30.

11. A composition according to claim 10, characterised in that D denotes the trivalent radical of an aromatic tricarboxylic acid.

12. A composition according to claim 11, characterised in that D denotes the radical of trimellitic acid.

13. A composition according to claim 1, characterised in that it comprises slightly branched polyesters, possessing 3 terminal carboxyl groups, of the formula

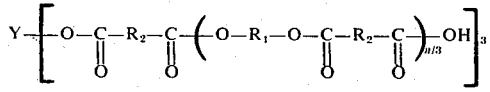

wherein $R_1$ and $R_2$ have the meaning as in the formula II, Y denotes the hydrocarbon radical, obtained by removing the hydroxyl groups, of a trihydric aliphatic or cycloaliphatic alcohol or of a trihydric phenol and $n$ denotes a number from 1 to 30, anf the quotient $n/3$ indicates the average number of the structural elements per linear branch chain.

14. A composition according to claim 13, characterised in that Y in the formula represents the radical of glycerol.

15. A composition according to claim 1, characterised in that it comprises slightly branched polyesters, possessing 3 terminal carboxyl groups, of the formula

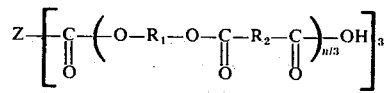

wherein $R_1$ and $R_2$ have the meaning as in the formula II, Z denotes the hydrocarbon radical, obtained by removing the carboxyl groups, of a tribasic aliphatic, cycloaliphatic or aromatic tricarboxylic acid and $n$ denotes a number from 1 to 30 and the quotient $n/3$ indicates the average number of the structural elements per linear branch chain.

16. A composition according to claim 15, characterised in that Z in the formula denotes the radical of trimellitic acid.

* * * * *